United States Patent [19]

Nakazato

[11] Patent Number: 5,627,653
[45] Date of Patent: May 6, 1997

[54] PRINT CONTROL DEVICE FOR DETERMINING A ROTATING SPEED OF A PRINT DRUM OF AN ELECTROPHOTOGRAPHIC PRINTER ACCORDING TO A DATA TRANSMISSION SPEED FROM A HOST SYSTEM

[75] Inventor: Hirohiko Nakazato, Tokyo, Japan

[73] Assignee: Oki Data Corporation, Tokyo, Japan

[21] Appl. No.: 557,752

[22] Filed: Nov. 13, 1995

[30] Foreign Application Priority Data

Nov. 22, 1994 [JP] Japan .................................. 6-312584

[51] Int. Cl.⁶ .................. H04N 1/29; H04N 1/23; G03G 21/00; G06F 15/00
[52] U.S. Cl. .................. 358/300; 358/296; 358/401; 395/114; 399/9
[58] Field of Search .................. 358/300, 296, 358/401, 404, 406, 434, 438, 439, 444, 468; 355/202–204, 208, 210; 395/101, 114, 115

[56] References Cited

U.S. PATENT DOCUMENTS

| | | | |
|---|---|---|---|
| 4,367,943 | 1/1983 | Nakamura | 358/300 |
| 4,972,226 | 11/1990 | Kawai | 358/300 X |
| 5,140,365 | 8/1992 | Hashimoto | 355/308 X |
| 5,457,483 | 10/1995 | Oikawa | 358/296 X |

*Primary Examiner*—Eric Frahm
*Attorney, Agent, or Firm*—Panitch Schwarze Jacobs & Nadel, P.C.

[57] ABSTRACT

A print control device for an electrophotographic printer for receiving print data from a host system, converting the print data into image data, and sequentially supplying the image data and a command signal to an engine controller for controlling an engine. The print control device includes a receiving buffer for temporarily storing the print data; a timer for measuring time; an interface process section for causing the timer to start when the print data begin to be received and causing the timer to stop when a predetermined amount of print data are stored in the receiving buffer; and a print start control section for computing a data transmission speed from the host system according to the time measured by the timer, and determining a rotating speed of a print drum according to the data transmission speed.

6 Claims, 14 Drawing Sheets

PRINT DATA FORMAT

PAGE HEADER PART

RASTER LINE DATA PART

FIG. 5

| PRINT DENSITY [DPI] | HORIZONTAL DOT QUANTITY [DOTS] | HORIZONTAL BYTE QUANTITY [BYTES] | VERTICAL LINE QUANTITY [LINES] | IMAGE DATA SIZE [KB] |
|---|---|---|---|---|
| 150 | 1200 | 150 | 1600 | 240 |
| 300 | 2400 | 300 | 3200 | 940 |
| 600 | 4800 | 600 | 6400 | 3750 |

RECEIVING STAGE NO. 0

RECEIVING STAGE NO. 2

EDITION STAGE NO. 0

EDITION STAGE NO. 1

EDITION STAGE NO. 2

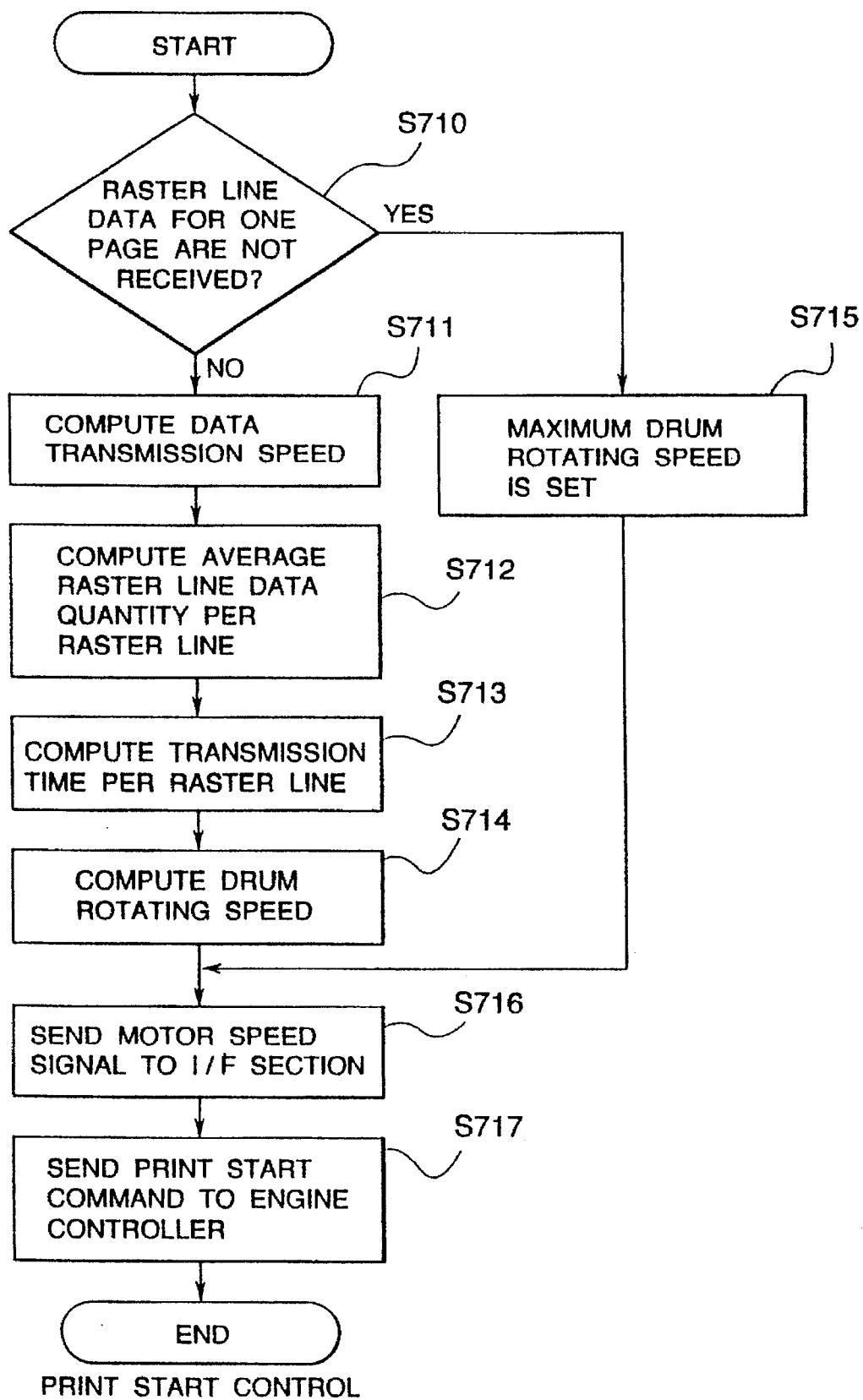

PAGE HEADER PART

PRINT CONTROL DEVICE FOR DETERMINING A ROTATING SPEED OF A PRINT DRUM OF AN ELECTROPHOTOGRAPHIC PRINTER ACCORDING TO A DATA TRANSMISSION SPEED FROM A HOST SYSTEM

BACKGROUND OF THE INVENTION

The present invention relates to a print control device for an electrophotographic printer which is a dumb print system.

In general, an electrophotographic printer comprises a data process controller for processing print data, an engine for performing a printing operation, and an engine controller for controlling the engine. In the case of the dumb print system, printing is performed while a data process controller receives the print data from a host system. Therefore, when the data process controller receives at least the initial line of print data, the engine controller is started, a paper is fed to the engine, and a print drum rotates at a predetermined speed. An electrostatic latent image is then formed on a surface of the print drum by exposure light emitted from a print head and developed by toner supplied from a developing unit, and the developed toner image is transferred onto the paper by a transfer unit and fixed by a fixing unit. In this case, by synchronizing the transmission speed of the print data from the host system and the rotating speed of the print drum, a good match can be obtained between the print data flow from the host system and the transport speed of the paper.

However, the following problem is encountered with the above-mentioned prior art. In cases where the data processing capability of the host system is inferior in comparison to the performance of the engine of the printer, print data transmission can not be synchronized to the rotating speed of the print drum. As a result, a case has occurred wherein after the printer has printed one line and before the print data of the next line are sent from the host system, the print drum transports the paper by more than the width of the one line. In such case, exposure by the print head can not keep pace with the paper transport (termed under-run) and empty spaces were produced between lines.

SUMMARY OF THE INVENTION

The object of the present invention is to provide a printer control device for an electrophotographic printer in which under-run error can be prevented, and high speed printing is enabled.

According to the present invention, a print control device for an electrophotographic printer receives print data from a host system (400), converts the print data into image data, and sequentially supplies the image data and a command signal to an engine controller (300) for controlling an engine (100) that includes a print head (103) and a print drum (101). The print control device comprises a receiving buffer (1) for temporarily storing the print data; a timer (2) for measuring time; an interface process section (3) for causing the timer to start when the print data begin to be received and causing the timer to stop when a predetermined amount of print data are stored in the receiving buffer (1); and a print start control section (4) for computing a data transmission speed from the host system (400) according to the time measured by the timer (2), and determining a rotating speed of the print drum (101) according to the data transmission speed.

BRIEF DESCRIPTION OF THE DRAWINGS

FIG. 5 is an explanatory diagram showing examples of a printing condition of the first embodiment;

FIG. 11 is a flowchart showing the process routine before the print start according to the first embodiment;

DETAILED DESCRIPTION OF THE INVENTION

Following is a description of the preferred embodiments of the present invention with reference to the attached drawings.

First Embodiment

Figure 1:
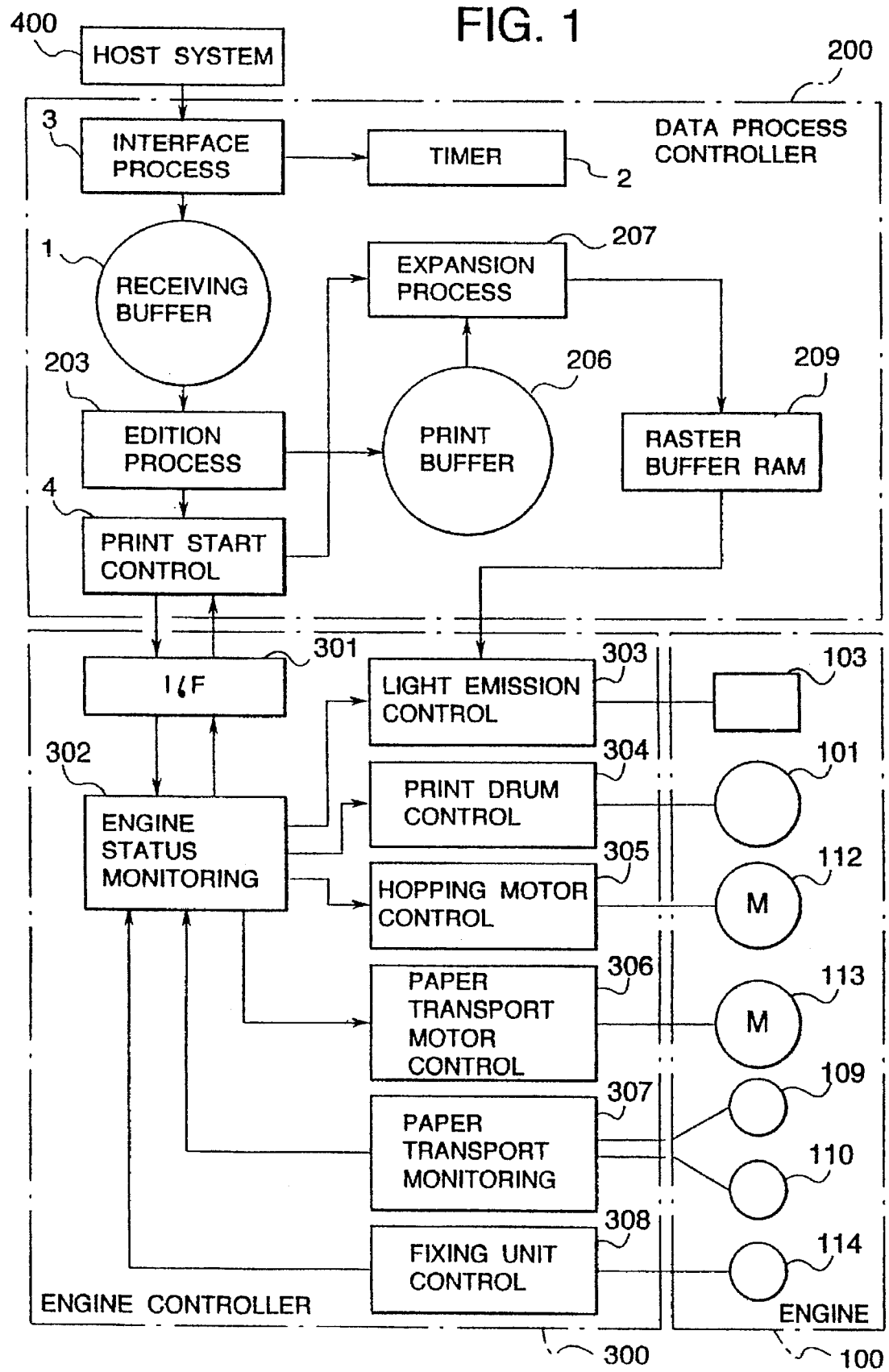
FIG. 1 is a block diagram showing a construction of an electrophotographic printer which is incorporated with a data process controller as a print control device according to a first embodiment of the present invention.

FIG. 1 is a block diagram showing a construction of an electrophotographic printer which is incorporated with a data process controller 200 as a print control device according to a first embodiment of the present invention. As shown in FIG. 1, the electrophotographic printer comprises an engine 100 for performing a printing operation, an engine controller 300 for controlling the engine 100, and the data process controller 200.

The data process controller 200 is connected to a host system 400 such as a work station or a personal computer. The data process controller 200 comprises a receiving buffer 1, a timer 2, an interface process section 3, and a print start control section 4.

The receiving buffer 1 comprises a RAM and the other components and temporarily stores the print data sent from the host system 400. The timer 2 is a hardware timer which starts to count down in one microsecond units and stops counting according to a command from the interface process section 3. The interface process section 3 has a timer run flag TMRNF for controlling the start and stop of the timer 2, and a timer overflow flag TMOVF indicating the overflow of the timer 2.

The interface process section 3 causes the timer 2 to start when the print data begin to be received and causes the timer 2 to stop when a predetermined amount of print data are stored in the receiving buffer 1. In other words, the timer 2 is started simultaneously when the leading print data of one page are received and stopped when the predetermined byte quantity of print data is stored in the receiving buffer 1, whereupon the interface process section 3 derives the operating time of the timer 2.

That is to say, the interface process section 8 performs, for example, the following processes. First, the interface process section 3 judges whether or not the receiving buffer 1 is empty. If the receiving buffer 1 is empty when the leading print data are received from the host system 400, the timer value is set to a predetermined initial value and then the timer 2 is started. Afterwards, while the receiving buffer 1 is in a state other then empty, the timer 2 continues to count down. The timer 2 is stopped at the point of time when the predetermined amount of print data is stored in the receiving buffer 1. By then reading out the timer value from the timer 2, the time is measured until the predetermined amount of print data is stored in the receiving buffer 1. Afterwards, the interface process section 3 requests the start of an edition process. Also, the start of the edition process is requested in the event the timer 2 overflows even before the predetermined data byte quantity has been received in the receiving buffer 1.

The print start control section 4 is started by the edition process section 203 described below, and sends a print start signal to an engine controller 300 and a expansion start command to an expansion process section 207. The print start control section 4 also computes the data transmission speed from the host system 400 according to the time obtained by the interface process section 3. The rotating speed of the print drum 101 is then determined on the bases of the data transmission speed. In addition, the print start control section 4 judges whether or not the print data for one page is stored in the receiving buffer 1. When the print data for one page are stored, since under-run error does not occur, the rotating speed of the print drum 101 is set to a maximum rotating speed. The control signal is then sent to the engine controller 300 from print start control section 4 according to the output signal form the edition process section 203.

The data process controller 200 also comprises the edition process section 203, a print buffer 206, an expansion process section 207 and a raster buffer RAM 209.

Figure 2:
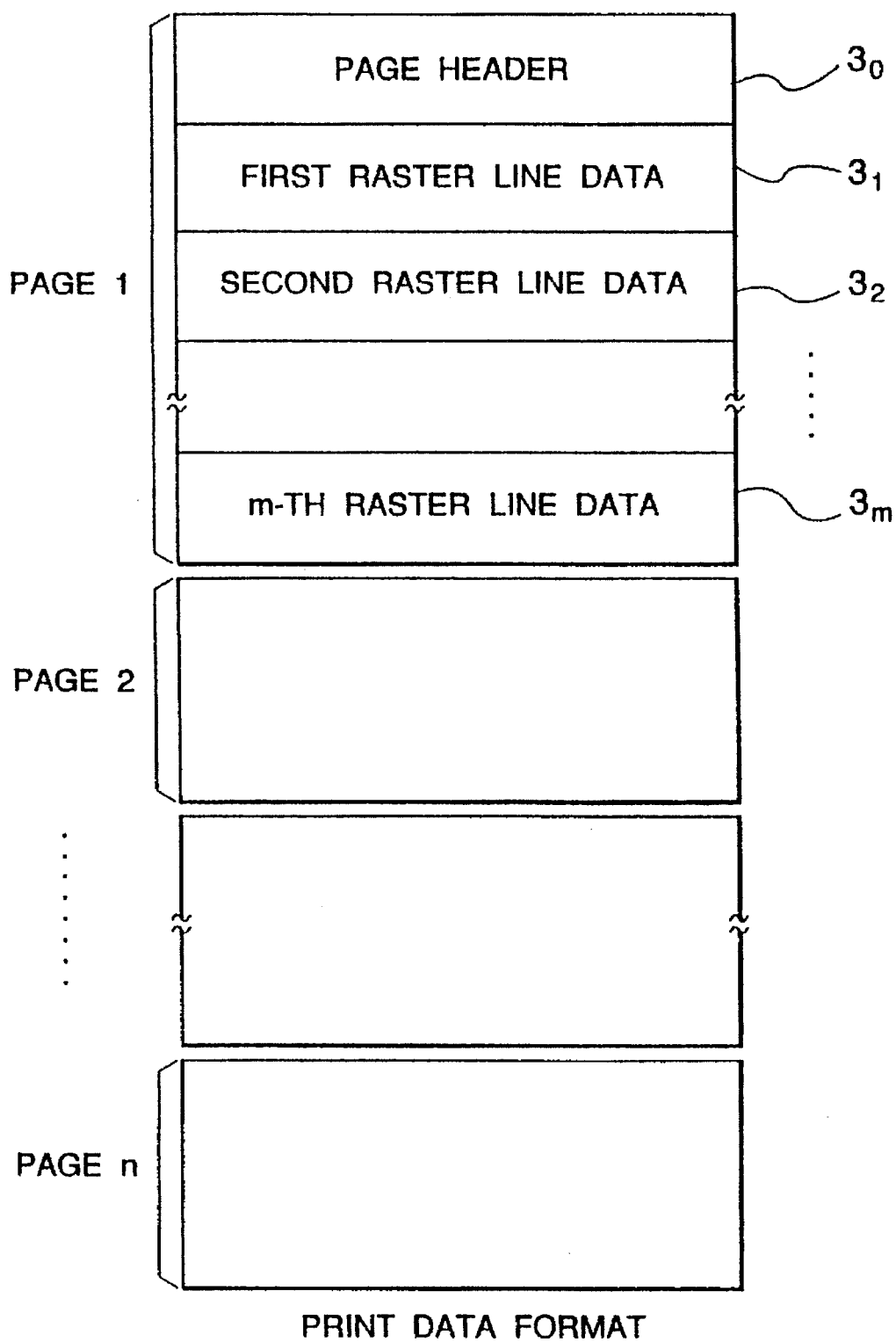
FIG. 2 is an explanatory diagram showing an example of print data format according to the first embodiment.

The edition process section 203 edits the print content data for one page on the basis of the print data sent from the receiving buffer 1. FIG. 2 shows an example of format of the print data sent from the host system 400. In FIG. 2, the print data of each page from page 1 to page n comprise a page header part $3_0$ and raster line data parts $3_1$–$3_m$.

Figure 3:
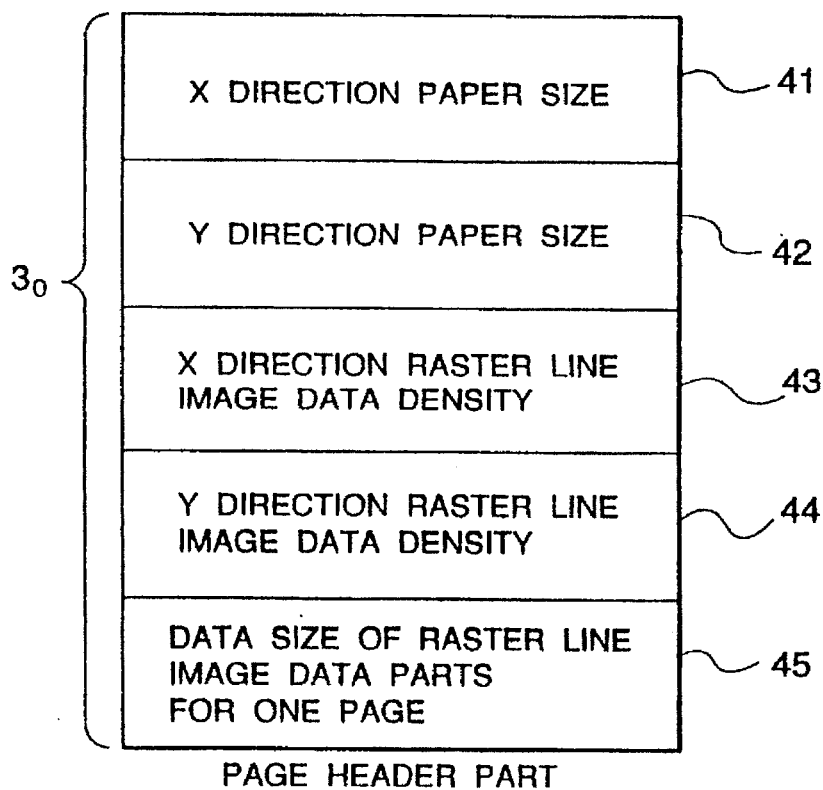
FIG. 3 is an explanatory diagram showing the detail of the page header part $3_0$ of FIG. 2.
Figure 4:
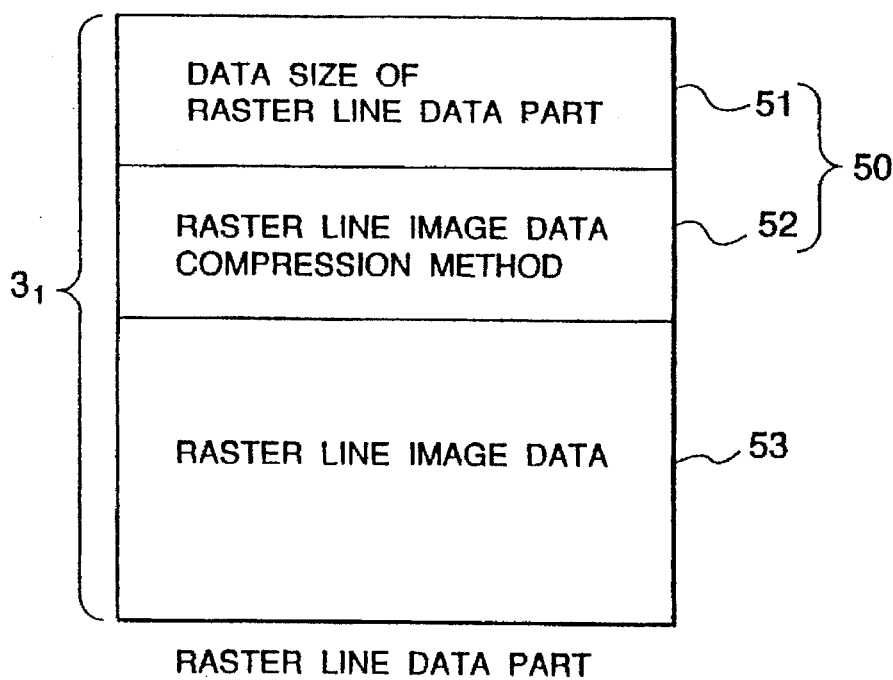
FIG. 4 is an explanatory diagram showing the detail of the raster line data part $3_1$ of FIG. 2.

FIG. 3 shows an example of the page header part $3_0$ of FIG. 2, and FIG. 4 shows an example of the raster line data part $3_1$ (or $3_2$, ..., $3_m$) of FIG. 2. As indicated in FIG. 3, the page header part $3_0$ contains an X direction paper size 41 and a Y direction paper size 42 indicating a paper size, where Y is the paper advancing direction and X is the direction perpendicular to Y direction. Also, the page header part $3_0$ contains data regarding X direction raster line image data density 43 and Y direction raster line image data density 44 indicating the image data density along X or Y direction produced by the host system 400. In addition, the page header part $3_0$ contains the raster line image data size 45 for one page which indicates byte quantity of the raster line data parts $3_1$–$3_m$.

Also, each raster line data part $3_1$–$3_m$, as indicated in FIG. 4 (only $3_1$ is shown), contains the data size 51 of the each raster line data part, i.e., the byte quantity of the raster line image data, the compression method 52 of the raster line image data and the raster line image data 53 for each raster line, respectively. Following is the description of FIG. 1.

When the edition process section 203 is started by the interface process section 3, while the data stored in the receiving buffer 1 are sequentially analyzed according to the data format indicated in FIGS. 2–4, the data of the page header part $3_0$ are stored in a print buffer 206 as print content data for one page. The end of the page can be distinguished by receiving the same data byte quantity as that indicated in the raster line image data size 45 for one page of the page header part $3_0$. Also, when the edition process section 203 confirms at least data quantity more than that of one raster line is stored in the receiving buffer 1, a request for beginning the print start process is sent to the print start control section 4.

The print buffer 206 comprises a RAM for storing the print data for one page edited by the edition process section 203 and the other components. The print buffer 206 stores at least one page of print data comprising the paper size, raster line image data density and the raster line image data size per page which are sent from edition process section 203.

According to the contents of the print buffer 206, the expansion process section 207 reads out the raster line image data from the receiving buffer 1, and expands the compressed print data into image data. In other words, the expansion process section 207 expands the raster line image data 53 into an actual raster line image data according to the raster line image data density sent from the print buffer 206 and the image data size for each raster line. The image data is then sent to the raster buffer RAM 209 to produce one page of image data for actual printing.

The raster buffer RAM 209 stores the image data expanded by the expansion process section 207. The raster buffer RAM 209 can store at least one raster line of image data into which the print data is converted by the expansion process section 207. The print image bit quantity for one page is not required for the raster buffer RAM 209.

FIG. 5 is an explanatory diagram showing examples of printing condition of the first embodiment. The conditions of FIG. 5 is for U.S. letter size paper. The conditions includes print densities [DPI], corresponding horizontal dot quantities [DOTS], corresponding horizontal byte quantities [BYTES], corresponding vertical line quantities [LINES], and corresponding image data sizes [KB]. In the case of the first embodiment, among the examples indicated in FIG. 5, an LED printer having 600 [DPI] resolution in both horizontal (main scanning) and vertical (sub-scanning) directions is considered.

Following is a description of the process routine of the interface process section 3 with reference to the flowcharts of FIGS. 6–9.

Figure 6:
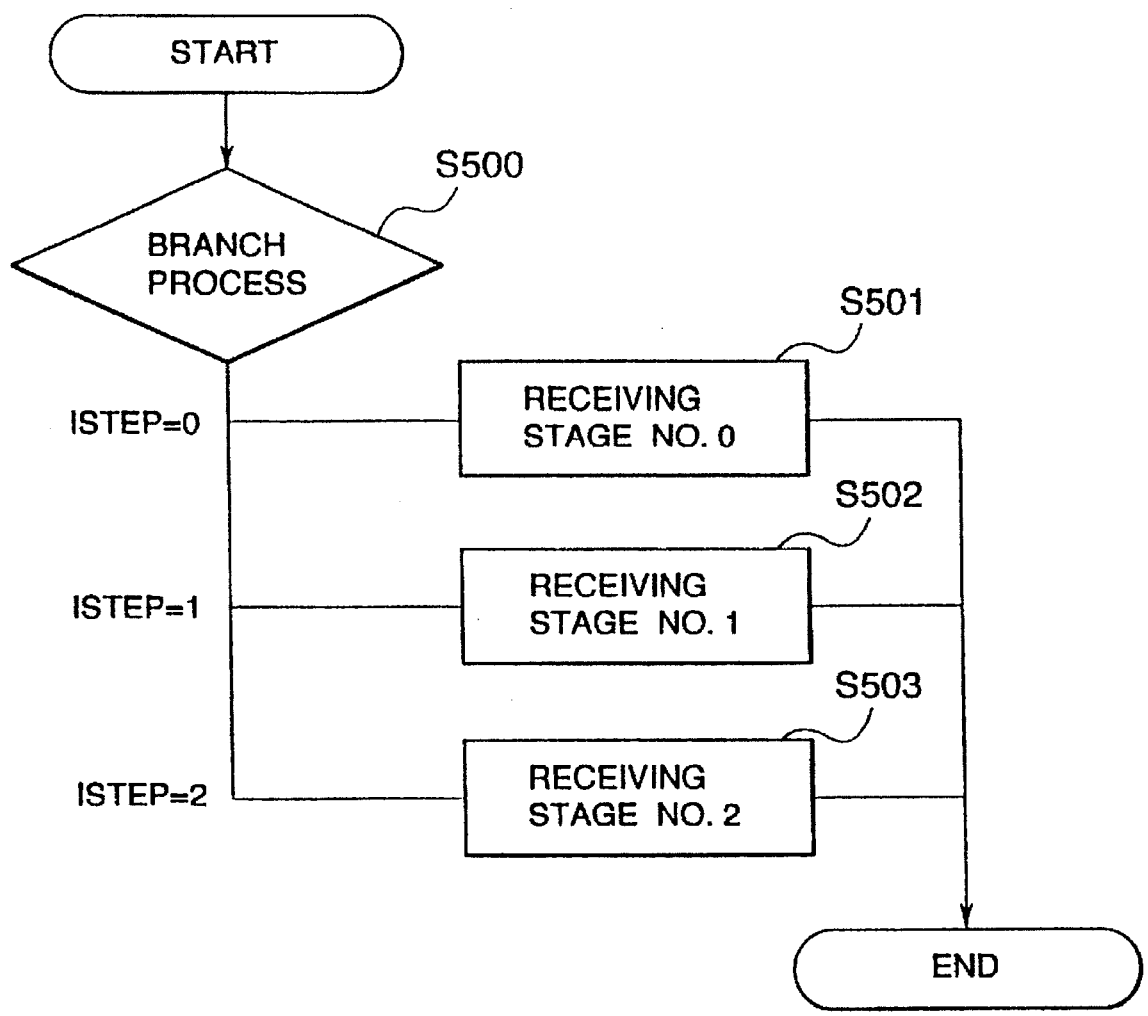
FIG. 6 is an explanatory diagram showing a process routine of the interface process section 3 according to the first embodiment.

FIG. 6 shows the main process of the interface process section 3. The interface process section 2 judges whether the interface process step variable ISTEP is equal to "0", "1" or "2" (step S500). When ISTEP="0", the process proceeds to a receiving stage No. 0 (step S501), when ISTEP="1", the process proceeds to a receiving stage No. 1 (step S502), and when ISTEP="2", the process proceeds to a receiving stage No. 2 (step S503).

Figure 7:
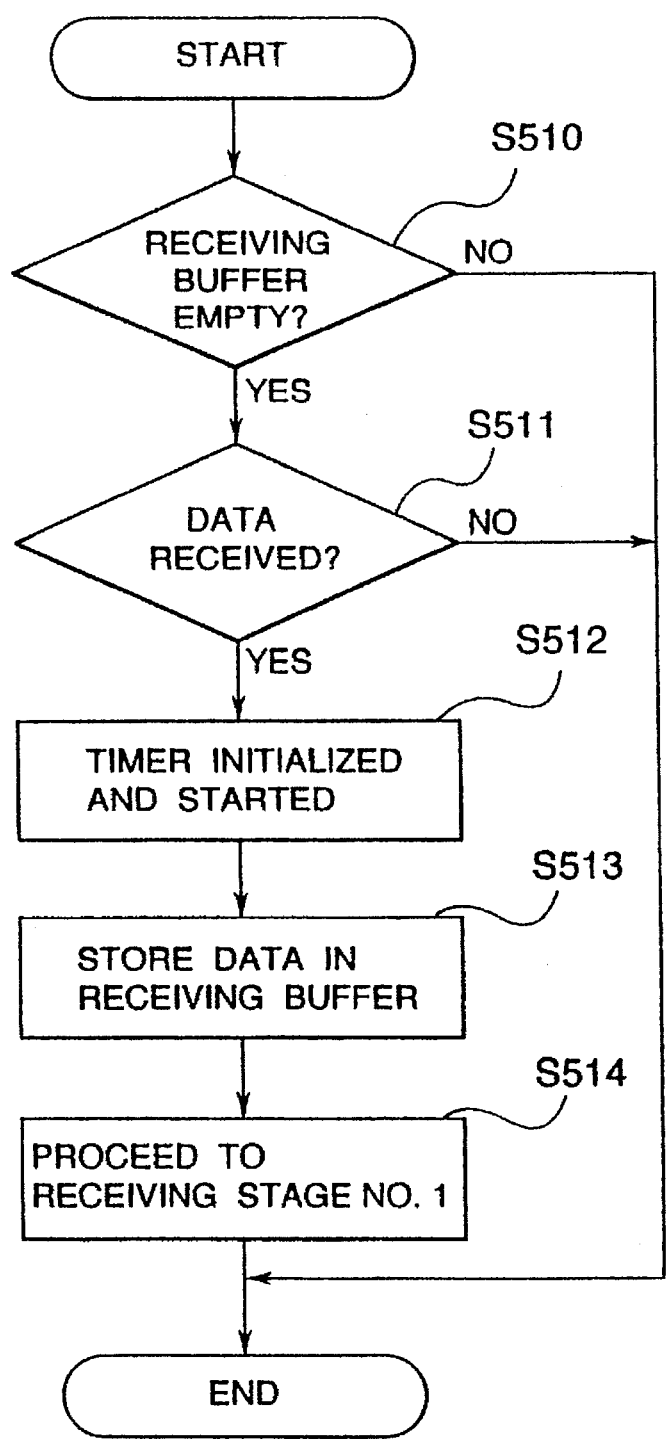
FIG. 7 is a flowchart showing the process routine of the receiving stage No. 0 in the step S501 of FIG. 6.

FIG. 7 depicts the process of the receiving stage No. 0 in the interface process section 3 (step S501). In the receiving stage No. 0, the interface process section 3 judges whether or not the receiving buffer 1 is empty (step S510) by detecting whether or not the data quantity RCVCT counted by the receiving buffer storage counter in the interface process section 3 is "0". If the receiving buffer 1 is not empty and contains data, the receiving stage No. 0 is completed. However, if the receiving buffer 1 is empty, the interface process section 3 judges whether or not data are received from the host system 400 (step S511). If data are not received from the host system 400, the receiving stage No. 0 is completed.

On the other hand, if data are received at the receiving stage No. 0 in the step S511, the interface process section 3 sets the timer value (TIMER) of the timer 2 to the initial value INTIM [microseconds] and sets the timer run flag TMRNF. As a result, the timer 2 is initialized and started (step S512), and by processing the receiving buffer contents (not shown in the figure), the data are stored in the receiving buffer 1 (step S513). The step variable ISTEP is set to "1" and the process proceeds to the receiving stage No. 1 (step SS14). When the data are stored in the receiving buffer 1 by processing the receiving buffer contents, the data quantity RCVCT counted by the receiving buffer storage counter is revised.

Figure 8:
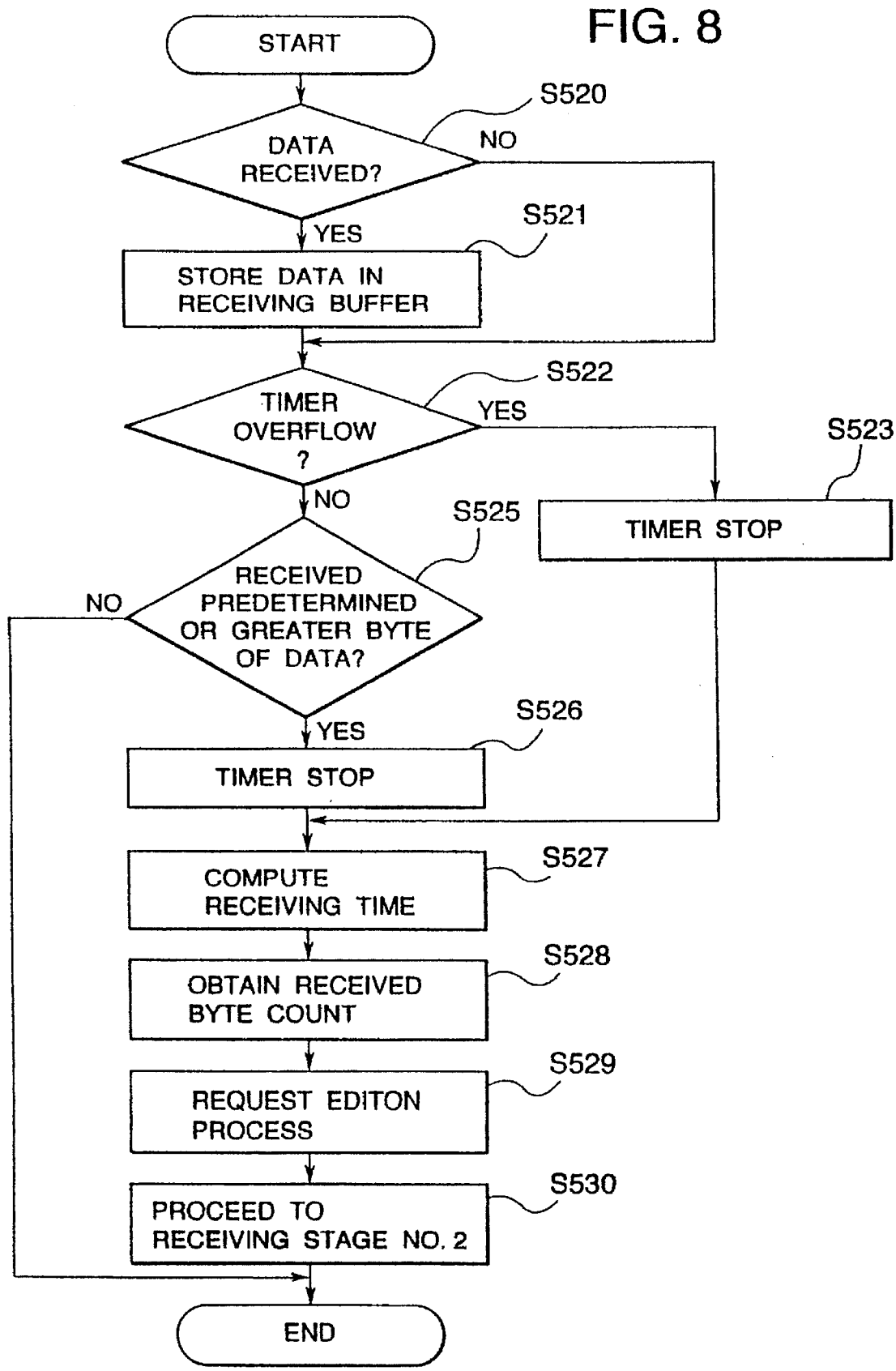
FIG. 8 is a flowchart showing the process routine of the receiving stage No. 1 in the seep S502 of FIG. 6.

FIG. 8 shows the process of the receiving stage No. 1 (step S502 in FIG. 6). In the receiving stage No. 1, whether or not the data are received is detected (step S520) and if received, the data are stored in the receiving buffer 1 (step S521). Next, the interface process section 3 judges whether or not the timer 2 overflows by detecting the state of the timer overflow flag TMOVF (step S522). If the timer 2 overflows, the timer 2 is stopped (step S523). If the timer 2 does not overflow, the receiving buffer storage counter of the interface process section 3 judges whether or not a predetermined or greater byte count of data is contained in the receiving buffer 1 (step S525). If less than the predetermined byte count of data is received, the process is ended. If the quantity of the data stored in the receiving buffer 1 is equal to or exceeds the receiving buffer storage byte check value RCVN initialized beforehand, the interface process section 3 stops the timer 2 (step S526).

Also, if the timer 2 overflows or the data stored in the receiving buffer 1 exceeds the receiving buffer storage byte check value RCVN, the interface process section 3 computes the receiving time from the start of the timer 2 to the stop, and stores the receiving time RTM (step S527). The received byte count RBT stored in the receiving buffer 1 is then computed and stored (step S528), and the interface process section 3 sets the edit process start request flag EDRQF to request an edition process (step S529). Afterwards, the step variable ISTEP is set to "2" to proceed to the receiving stage No. 2 (step S580) and complete the present process.

Figure 9:
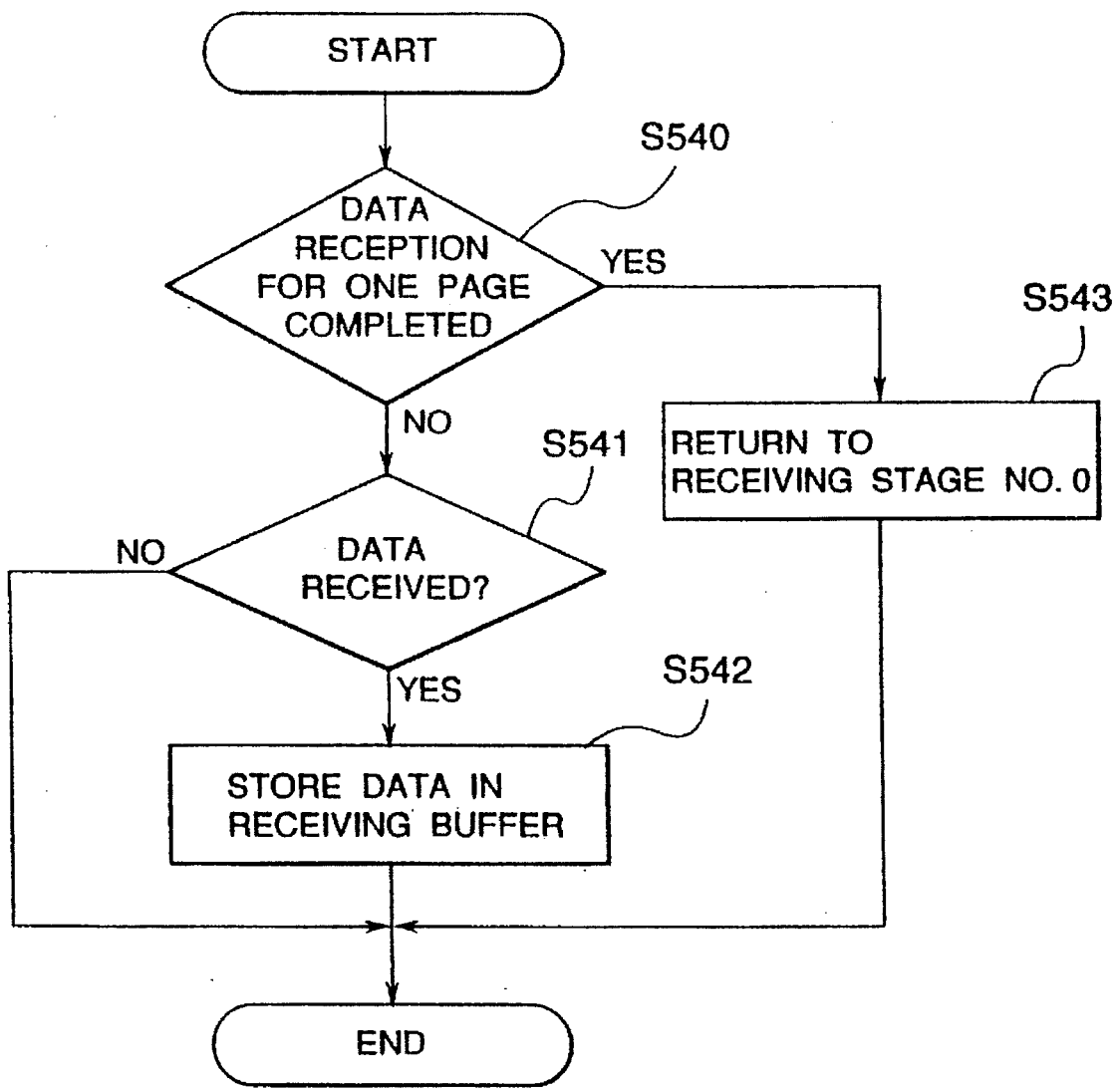
FIG. 9 is a flowchart showing the process routine of the receiving stage No. 2 in the step S503 of FIG. 6.

FIG. 9 indicates a process of the receiving stage No. 2 in the interface process section 3 (step S503 in FIG. 6). In the receiving stage No. 2, the interface process section 3 compares the data quantity RCVCT counted by the receiving buffer storage counter of the interface process section 3 with the data quantity counted by a page data counter PAGCT and indicating the data size of one page stored in the print buffer 206 by the edition process section 202. As a result of this comparison, whether or not data reception for one page has been completed is detected (step S540). If reception of data has not been completed for one page of data, whether or not data are received is checked (step S540). If the data are received, the received data are stored in the receiving buffer 1 (step S542). In step S540, if reception of data for one page is complete, the step variable returns to "0", returning the process to the receiving stage No. 0.

Figure 10A:
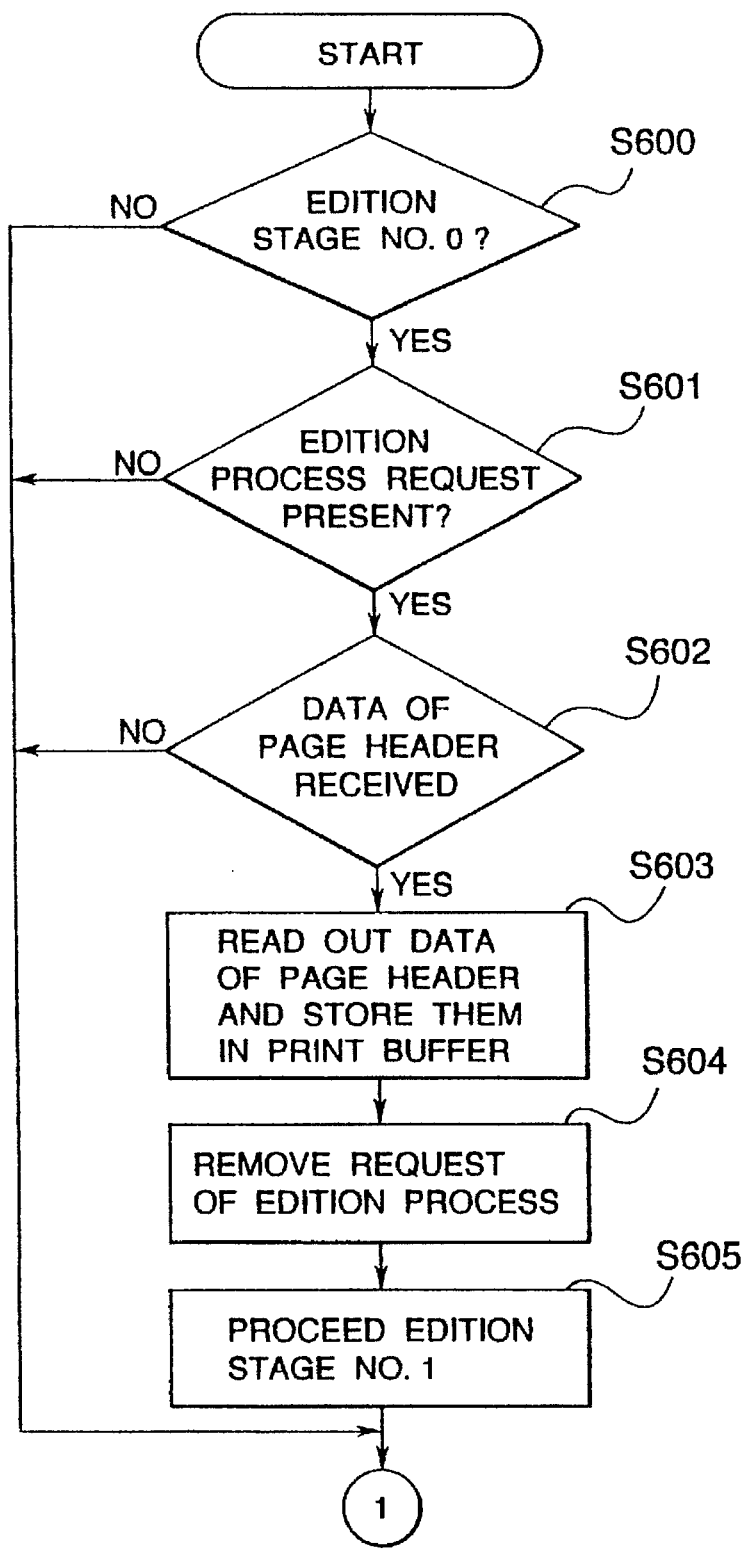
FIG. 10A is a flowchart showing the process routine of the edition stage No. 0 according to the first embodiment.

Next, the process routine of the edition process section 203 of FIG. 1 is described below with reference to FIGS. 10A–10C. As shown in FIG. 10A, the edition process section 203 judges whether or not the edition stage No. 0 is selected by detecting whether or not an edition process step variable ESTEP indicating the edition process stage number is "0" (step S600). If the edition stage No. 0 is selected, the edition process section 203 judges whether or not the edition process request sent from the interface process section 3 is present by detecting whether or not the edition process request flag EDRQF is "1" (step S601). If the edition process request is present, the edition process section 203 judges whether or not the data of the page header part $3_0$ are already stored in the receiving buffer 1 (step S602).

If the above three judgments (steps S600, S601 and S602) are all true, the data of the page header part $3_0$ are read out from the receiving buffer 1 and stored in the print buffer 206 (step S603). The print buffer 206 functions as a memory which stores data of PGHDN [bytes], comprising the X direction paper size, Y direction paper size, X direction raster line image data density, Y direction raster line image data density, and data size of raster line image data parts for one page. The respective areas for X direction paper size, Y direction paper size, X direction raster line image data density, Y direction raster line image data density, and data size of the raster line image data part for one page are indicated by variables PGWID, PGLNG, RDPIH, RDPIV and PAGCT, respectively. At this point, the data quantity RCVCT counted by the receiving buffer storage counter is subtracted by PGHDN [bytes]. In addition, the edition process section 203 clears the edition process request flag EDRQF (step S604) to remove the request of the edition process, and changes the edition process step variable ESTEP to "1" to proceed to the process of the edition stage No. 1 (step S605).

Figure 10B:
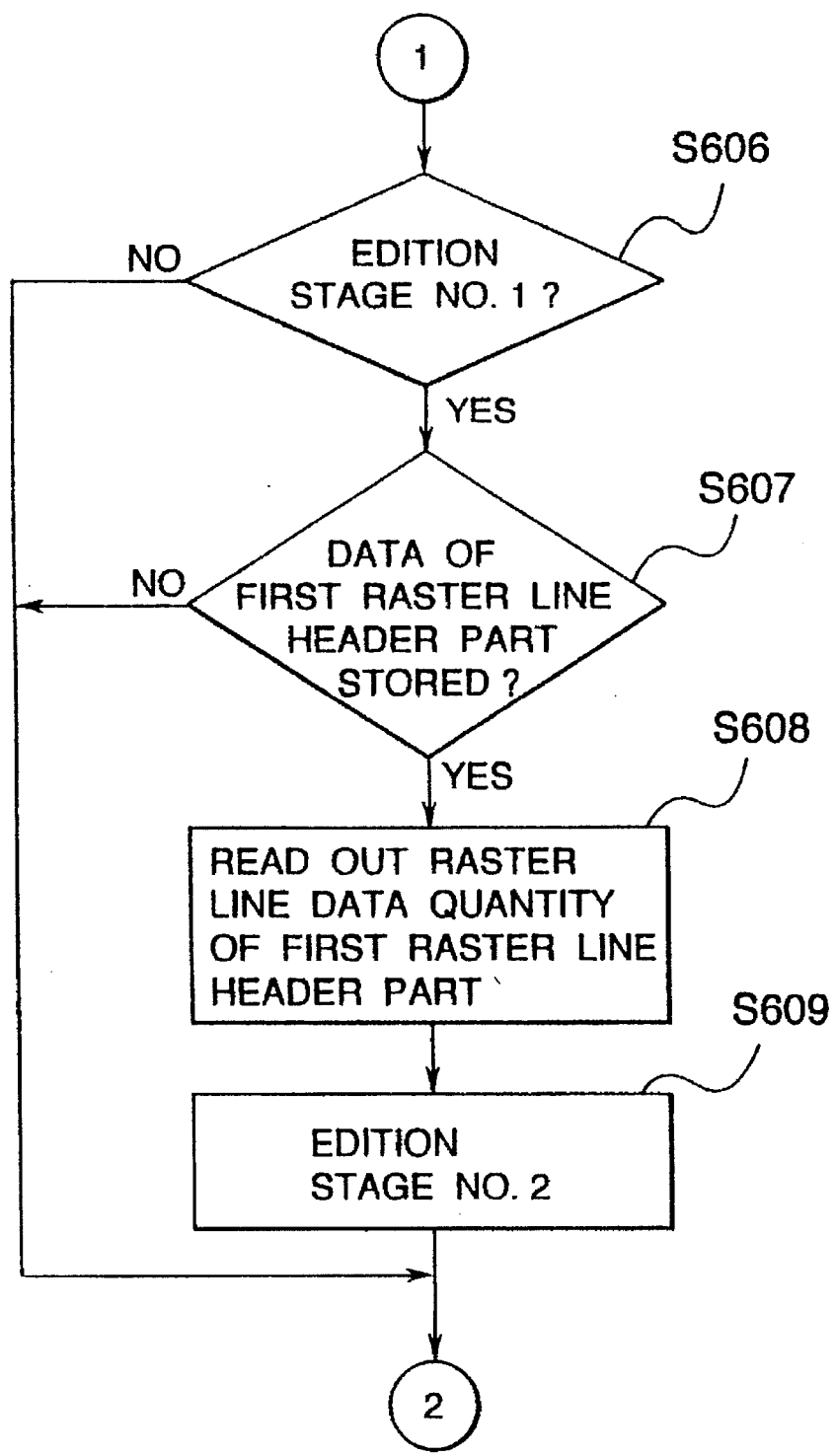
FIG. 10B is a flowchart showing the process routine of the edition stage No. 1 continued from FIG. 10A according to the first embodiment.

Next, at the step S606 in FIG. 10B, the edition process section 203 judges whether or not the edition process step variable ESTEP is "1" (i.e., the edition stake No. 1 is selected). If the edition process step variable ESTEP is "1", the edition process section 203 judges whether or not the data of the header information part 50 of the first raster line data part $3_1$ is already stored in the receiving buffer 1 (step S607). As shown in FIG. 4, the header information part 50 of the the first raster line data part $3_1$ is composed of the data size 51 of the raster line data part and the raster line image data compression method 52, and is the RSHDN [bytes] in size. If the data of the header information part 50 of the first raster line data part $3_1$ is already stored in the receiving buffer 1, the data size 51 of the first raster line data part $3_1$ (i.e., the raster line data quantity RASCT) is read out from the receiving buffer 1 and stored (step S608). The process then proceeds to the edition stage No. 2 (step S609).

Figure 10C:
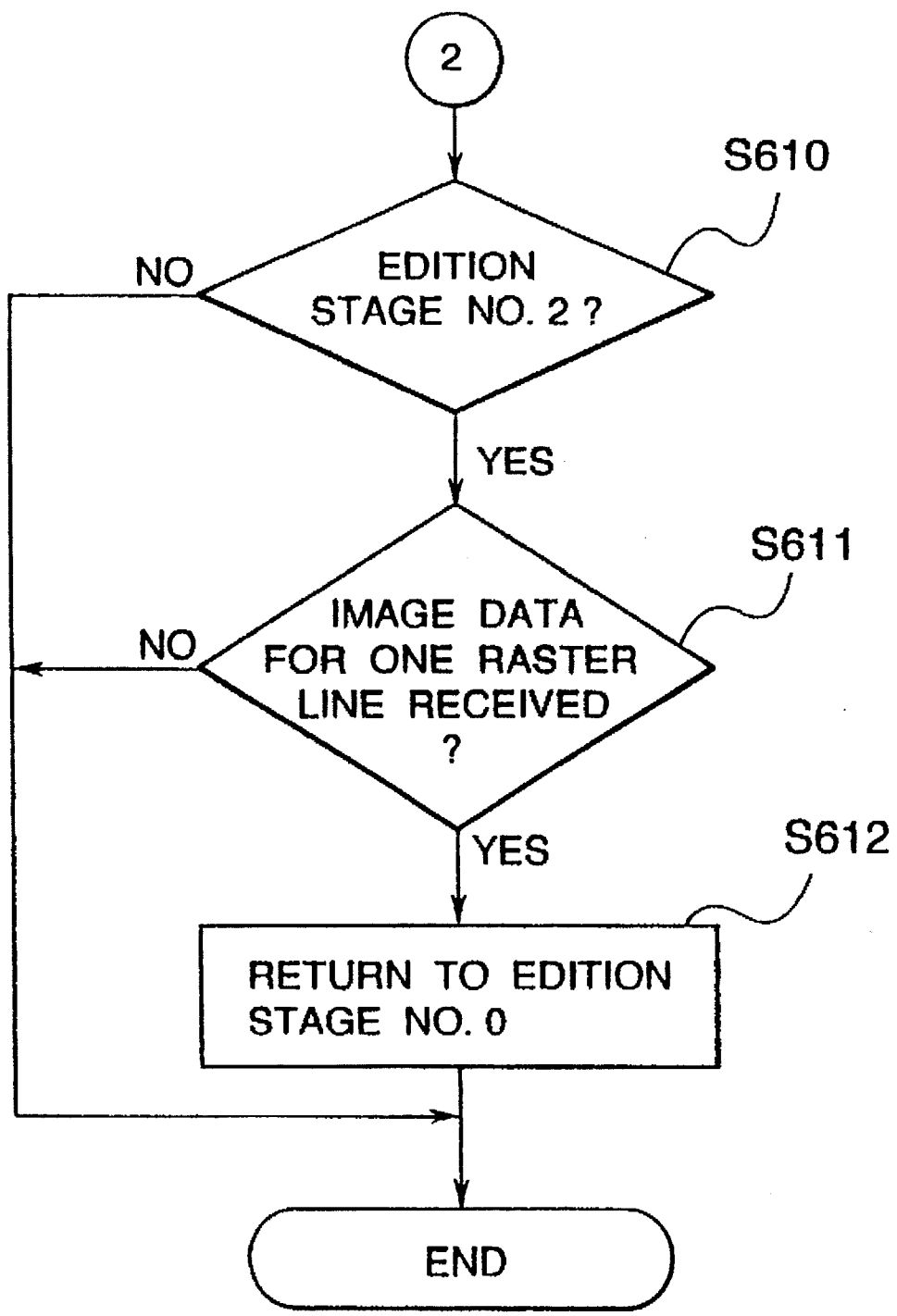
FIG. 10C is a flowchart showing the process routine of the edition stage No. 2 continued from FIG. 10B.

Next, at the step S610 in FIG. 10C, the edition process section 203 judges whether or not the edition process step variable ESTEP is "2" (i.e., the edition stage No. 2 is selected). If the edition process step variable ESTEP is "2", the edition process section 203 judges whether or not the image data for the first raster line have been received (step S611). If the image data for the first raster line have been received and stored in the receiving buffer 1, the process returns to the edition stage No. 0 indicated in FIG. 10A (step S612).

When the edition process section 203 has completed processing the page header part $3_0$ and the image data for the first raster line in the above manner, as shown in FIG. 11, the print start control section 4 computes the rotating speed of the print drum 101 (steps S710 to S714) and transmits a speed signal to the I/F section 301 of the engine controller 300 (step S716). The engine status monitoring section 302 of the engine controller 300 causes the motor 101 to rotate on the basis of the motor speed signal received via the I/F section 301.

The drum rotating speed is computed at the print start control section 4 according to the process routine indicated in FIG. 11. The print start control section 4 judges whether or not the raster line data for one page has already been received in the receiving buffer 1 by comparing the data quantity RCVCT of the receiving buffer contents counter with the total raster line size for one page PAGCT (step S710). If the raster line data for one page has not been received, the process proceeds to the step S711 and the data transmission speed from the host system 400 is computed as indicated below. The transmission speed per byte VRCV [microseconds/byte] is computed from the receiving time RTM [microseconds] set by the interface process section 3 and receiving byte count RBT [bytes] according to the following formula (step S711).

$$VRCV = RTM/RBT \quad (1)$$

Next, the average raster line data quantity per raster line RAVCT [bytes] to be received after printing start, is derived by the following computation. The total raster line data quantity per page is PAGCT [bytes], while the data quantity already stored in the receiving buffer 1 is RCVCT [bytes]. Therefore, the data quantity A [bytes] to be received after printing start is computed by the following formula:

$$A = PAGCT - RCVCT \quad (2)$$

Also, the raster line quantity per page B [lines] is computed from the Y direction raster line data density RDPIH [DPI] and Y direction paper size PGLNG [inches] by the following formula:

$$B = RDPI * PGLNG \quad (3)$$

Therefore, since the average raster line image data quantity per raster line RAVCT [bytes/line] is computed by RAVCT= A/B, the average raster line image data quantity RAVCT is computed by the following formula (step S712):

$$RAVCT = (PAGCT - RCVCT)/(RDPIH * PGLNG) \quad (4)$$

Next, the data transmission time per raster line RAVTM [microseconds] is then computed from the average raster line data quantity per line RAVCT [bytes] and the data transmission speed VRCV [microseconds/byte] by the following formula (step S713)

$$RAVTM = VRCV * RAVCT \quad (5)$$

Next, the drum rotating speed VDRUM [IPS (inches/ second)] is computed. By taking the resolution in the main scanning direction as PDPI [DPI], the paper transport time per raster line MVT [microseconds] is obtained by the following formula:

$$MVT = 10^6/(PDPI * VDRUM) \quad (6)$$

Since under-run error is not produced if the paper transport time per raster line MVT is greater than the average data transmission time per raster line RAVTM [microseconds] of raster line data. This relationship is expressed by the following formula:

$$RAVTM < MVT \quad (7)$$

Formulas (6) and (7) lead to the following formula:

$$RAVTM < 10^6/(PDPI * VDRUM) \quad (8)$$

The drum rotating speed VDRUM [IPS] is then set to the maximum value which conforms to Formula (8) (step S714).

If the raster line data for one page are already received in the step S710, the process proceeds to the step S715 and the maximum drum rotating speed VDMAX [IPS] in consideration of the engine performance and the print drum operating capability is set as the drum rotating speed VDRUM [IPS] (step S715). The rotating speed of the print drum can be determined in this manner. After the step S714 or S715, motor speed signal is sent to the I/F section 301 of the engine controller 300 (step S716), and then print start command is sent to the engine controller 808 (step S717).

For example, assume an LED printer having 600 [DPI] resolution in both main scanning and sub scanning directions prints on U.S. letter size paper (8.5"*11"), the total raster line data per page is 2,621,440 [bytes], 20,000 [bytes] of data are already stored in the receiving buffer 1, and 10,000 [bytes] of data are received in 50,000 [microseconds]. In this case, the variables become as follows:

PAGCT=2,621,440 [bytes]
RCVCT=20,000 [bytes]
RTM=50,000 [microseconds]
RBT=10,000 [bytes]
PDPI=600 [DPI]

From Formula (1), the data transmission speed becomes:

$$\begin{aligned} VRVC &= RTM/RBT \\ &= 50,000/10,000 \\ &= 5 \text{ [microseconds/byte]} \end{aligned}$$

When the raster line data density transmitted from the host system 400 is 600 [DPI] in both the X and Y directions, RDPIH=600, RDPIV=600, and PGLNG=11. Thus, from Formula (4), the average raster line image data quantity per raster line RAVCT is obtained by the following formula:

$$\begin{aligned} RAVCT &= (PAGCT - RCVCT)/(RDPH * PGLNG) \\ &= (2,621,440 - 20,000)/(600 * 11) \\ &= 394 \text{ [bytes/line]} \end{aligned}$$

From Formula (5), the data transmission time RAVTN is obtained by the following formula:

$$\begin{aligned} RAVTM &= VRCV * RAVCT \\ &= 5 * 394 \\ &= 1,970 \text{ [microseconds]} \end{aligned}$$

Therefore, the drum rotating speed VDRUM according to Formula (8) becomes as follows:

$$\begin{aligned} VDRUM &< 10^6/(PDPI * RAVTM) \\ &= 1,000,000/(600 * 1,970) \\ &= 0.84 \text{ [IPS]} \end{aligned}$$

Figure 12:
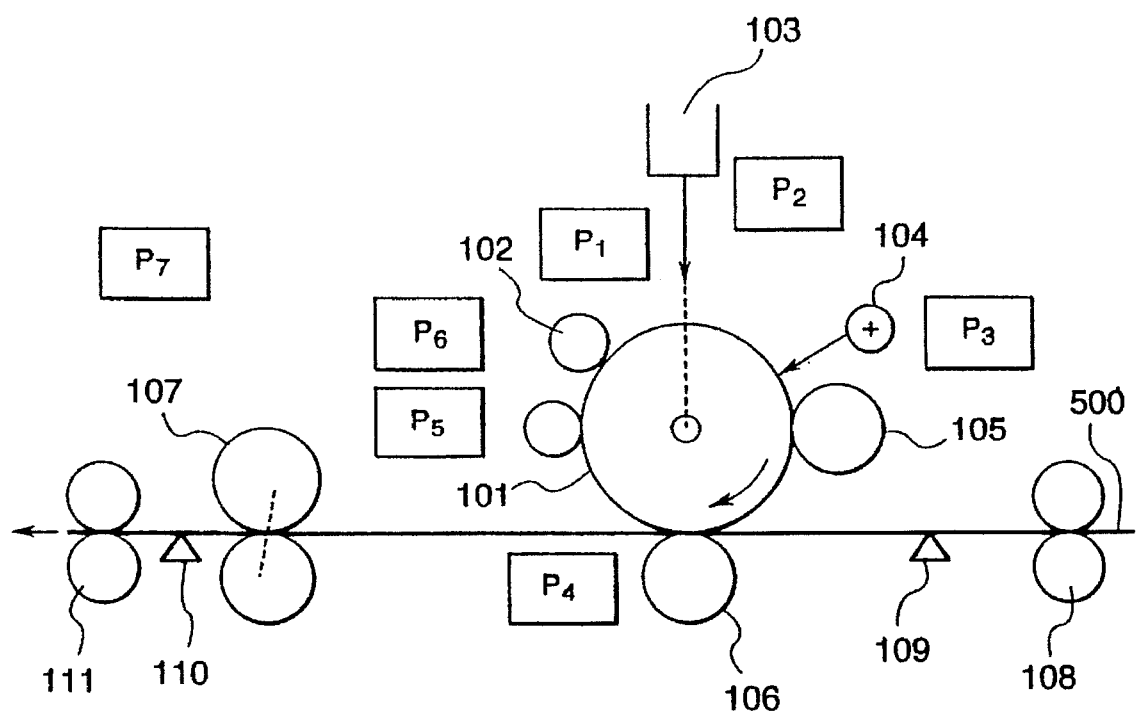
FIG. 12 is an explanatory diagram showing the construction of the electrophotographic printer according to the first embodiment according to the first embodiment.

Following is a description of the engine controller 300 with reference to FIGS. 1 and 12. The engine controller 300 comprises the I/F section 301 for sending and receiving control signals to and from the print start control section 4, and an engine status monitoring section 302 for monitoring states of respective components within the engine controller 300 and outputting control signals. The engine controller 300 also comprises a light emission control section 303 for receiving image data from the raster buffer RAM 209 by one row of the X direction at a time and controlling light emission ($P_2$ in FIG. 12) of the LED head 103. The engine controller 300 also comprises a paper transport motor control section 306 for controlling the orating speed of the paper transport motor 113 of the engine 100 on the basis of the printing start signal received by the I/F section 301.

The engine controller 300 further comprises a print drum control section 304 for controlling print functions of the print drum 101 such as charging ($P_1$ in FIG. 12), developing ($P_3$ in FIG. 12), transferring ($P_4$ in FIG. 12), discharging ($P_5$ in FIG. 12), and cleaning ($P_6$ in FIG. 12), a hopping motor control section 305 for controlling a hopping motor 112 attracting the paper, a paper transport monitoring section 307 for monitoring the transport status of the paper 500, and a fixing unit control section 308 for fixing the toner image transferred to the paper from print drum ($P_7$ in FIG. 12).

Following is a description of the engine 100 with reference to FIGS. 1 and 12. FIG. 12 schematically shows a construction of the engine 100 for an electrophotographic printer. The engine 100 comprises the print drum 101, the LED head 103 which is controlled by the light emission control section 303 and scans by the exposure light in X direction of the print drum 101 (i.e., direction parallel to the central axis of the print drum), the motor 113 for rotating the print drum 101, a hopping motor 112 for attracting the paper 500, a hopping sensor 109 for monitoring the hopping status of the paper 500, and an ejection sensor 110 for monitoring whether or not the paper 500 is ejected. The engine 100 comprises, in cases where a heater is used for the fixing unit, a temperature sensor 114 for monitoring the heater temperature.

Operation of the above-mentioned electrophotographic printer is described below. In the engine controller 300, when the print start signal and motor speed signal are received from the data process controller 200, the I/F section 301 sends these signals to the engine status monitoring section 302. The engine status monitoring section 302 sends commands for attracting the paper 500 to the hopping motor control section 305, and sends commands for controlling the rotation of the print drum 101 and the paper transport based on the motor speed signal having the above-mentioned control contents outputted from the motor controller 200 to the paper transport motor control section 306.

The hopping motor control section 305 receives the motor start command from the engine status monitoring section 302 and causes the hopping motor 112 to operate in order to supply the paper 500 from a paper tray. The paper transport motor control section 306 then causes the paper transport motor 113 to operate in order to rotate the print drum 101 and transport the paper 500.

The paper transport monitoring section 307 monitors the transport position of the paper 500. When the paper 500 is transported to a predetermined position, which is informed to the engine status monitoring section 302 by the paper transport monitoring section 307.

On the basis of the motor speed signal, the engine status monitoring section 302 sends control commands for rotating the print drum 101 and transporting the paper 500 to the paper transport motor control section 306, and inputs the X direction image data for the raster line quantity specified by the raster buffer RAM 209 one row at a time. The raster line data are then sent as a video signal to the light emission control section 303 for emitting light in order to form an electrostatic latent image. The video signal transmission and paper transport speed are controlled in synchronization with a clock to enable precise printing at the adequate paper position.

The electrostatic latent image is developed in accordance with the print drum control section 304 by a developing unit 105 and toner 104, then the image is transferred onto the paper by a transfer unit 106. The transferred image is fixed on the paper 500 by a fixing unit 107. When fixing is performed by a heater of the fixing unit 107, the temperature of the heater is controlled by the fixing unit control section 308.

In the case of this type printing operation, the print drum 101 is rotated at the appropriate predetermined speed set by the above-mentioned motor speed signal.

In the above manner, even in cases where the printer does not have a memory which is able to store data corresponding to the raster image data size of one page, the print data transmission speed from the host system 400 is computed, the print data transmission time is computed on the basis of the transmission speed, and on the basis thereof, the rotating speed of the print drum 101 is computed. As a result, the rotating speed of the print drum 101 can be optimized to perform printing. Consequently, under-run error can be avoided and printing can be performed at the highest speed possible.

Second Embodiment

Figure 13:
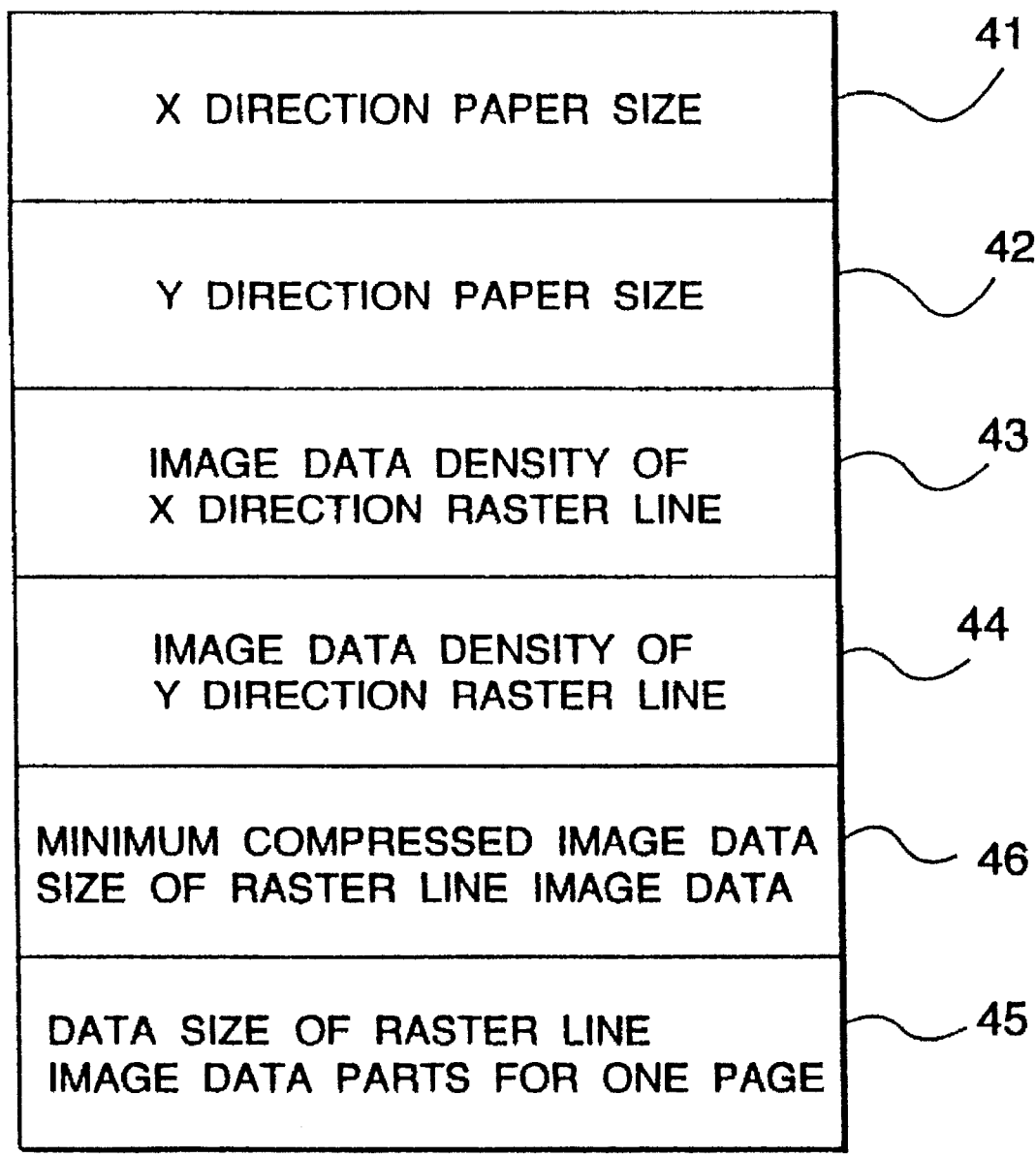
FIG. 13 is an explanatory diagram showing the page header part according to a second embodiment of the present invention.

In the case of the second embodiment, as indicated in FIG. 13, the minimum compressed image data size 46 for the the raster line image data is set in the page header part $3_0$ of the print data and is used as one element for computing the rotating speed of the print drum 101. The minimum compressed image data size 46 of raster line is set as variable RWCOMP in the print start control section 4.

When computing the rotating speed of the print drum 101 in the print start control section 4, the data transmission speed VRCV computed by the above Formula (1) and the minimum compressed image data size of raster line are multiplied to compute the maximum data transmission time per raster line RWSTM. The maximum data transmission time per raster line RWSTM is then compared with the paper transport time MVT per raster line computed by Formula (6). In the same manner as the first embodiment, the rotating speed VDRUM of the print drum is determined so that the paper transport time MVT is slightly larger than the maximum data transmission time per raster line RWSTM. Other points are the same as the above described first embodiment.

For example, in the case of the above-mentioned U.S. letter size paper, when taking the minimum compressed image data size of raster line RWCOMP as 480 [bytes], the maximum data transmission time per raster line RWSTM is 2,400 [microseconds] and the drum rotating speed VDRUM is 0.69 [IPS].

In the case of the second embodiment as well, since the overall operation of the electrophotographic printer is the same as the first embodiment, a repeated description is omitted.

In the above manner, even in cases where the printer does not have a memory which is able to store data corresponding to the raster image data size of one page, the print data transmission speed from the host system 400 is computed, the print data transmission time is computed on the basis of the transmission speed, and on the basis thereof, the rotating speed of the print drum 101 is computed. As a result, the rotating speed of the print drum 101 can be optimized to perform printing. Consequently, under-run error can be avoided and printing can be performed at the highest speed possible.

The foregoing embodiments were described by way of examples and do not limit the present invention, while numerous variations are possible within the scope of the invention. For example, although the above embodiments were described with reference to an LED printer, this is not a limitation and the present invention can also be applied to a laser printer or the like.

What is claimed is:

1. A print control device for an electrophotographic printer, comprising:

a timer;

an interface process section operatively coupled to a host system for receiving print data therefrom, the interface process section also being operatively coupled to the timer, the interface process section for starting the timer at a time T1 when the print data is initially received from the host system and for stopping the timer at a time T2 when a predetermined amount of the print data is received from the host system;

a receiving buffer operatively coupled to the interface process section for receiving the print data therefrom and for temporarily storing the print data;

a print data converter operatively coupled to the receiving buffer for obtaining the print data therefrom, for converting the print data into image data, and for sequentially supplying the image data and a command signal to an engine controller, the engine controller for controlling a print engine according to the image data and the command signal, the print engine including a print head and a print drum having a rotating speed; and a print start control section operatively coupled to the interface process section for computing a data transmission speed from the host system according to the time T1, the time T2, and the predetermined amount of the print data, for determining the rotating speed of the print drum according to the data transmission speed, and for supplying the determined rotating speed to the engine controller.

2. The print control device for an electrophotographic printer of claim 1, wherein said print start control section derives average image data amount per raster line of a print image, computes data transmission time per raster line on the basis of said data transmission speed and said average image data amount per raster line, and thereby determines said rotating speed of said printer drum on the basis of said data transmission time per raster line.

3. The print control device for an electrophotographic printer of claim 2, wherein a data quantity to be received after printing start is computed by subtracting a data quantity already stored in said receiving buffer from a total raster line data quantity per page, and said average raster line image data amount per raster line is computed by dividing said data quantity to be received after printing start by a raster line quantity per page.

4. The print control device for an electrophotographic printer of claim 1, wherein said print start control section derives lowest compressed image data size per raster line of a print image, computes maximum data transmission time per raster line on the basis of said data transmission speed and said lowest compressed image data size per raster line, and thereby determines said rotating speed of said printer drum on the basis of said maximum data transmission time per raster line.

5. The print control device for an electrophotographic printer of claim 1, wherein said receiving buffer receives said print data for one raster line successively, and when said receiving buffer receives said print data for at least an initial raster line, said engine controller is started, a paper is fed to said engine, and said print drum begins to rotate.

6. A print control device for an electrophotographic printer, comprising:

a timer;

an interface process section operatively coupled to a host system for receiving print data therefrom, the interface process section also being operatively coupled to the timer, the interface process section for starting the timer at a time T1 when the print data is initially received from the host system and for stopping the timer at a time T2 when a predetermined amount of the print data is received from the host system;

a receiving buffer operatively coupled to the interface process section for receiving the print data therefrom and for temporarily storing the print data;

a print data converter operatively coupled to the receiving buffer for obtaining the print data therefrom, for converting the print data into image data, and for sequentially supplying the image data and a command signal to an engine controller, the engine controller for controlling a print engine according to the image data and the command signal, the print engine including a print head and a print drum having a rotating speed; and a print start control section operatively coupled to the interface process section and the receiving buffer, the print start control section for determining whether one page of print data is stored in the receiving buffer, the print start control section, if one page of print data is stored in the receiving buffer, determining the rotating speed of the print drum to be a maximum rotating speed, and the print start control section, if one page of print data is not stored in the receiving buffer, computing a data transmission speed from the host system according to the time T1, the time T2, and the predetermined amount of the print data, and determining the rotating speed of the print drum according to the data transmission speed, the print start control section for supplying the determined rotating speed to the engine controller.

* * * * *